(12) United States Patent
Furuya et al.

(10) Patent No.: US 8,013,257 B2
(45) Date of Patent: Sep. 6, 2011

(54) ELECTRONIC COMPONENT

(75) Inventors: Akira Furuya, Tokyo (JP); Masahiro Miyazaki, Tokyo (JP); Hiroshi Take, Tokyo (JP); Keisuke Takasugi, Tokyo (JP)

(73) Assignee: TDK Corporation, Tokyo (JP)

( * ) Notice: Subject to any disclaimer, the term of this patent is extended or adjusted under 35 U.S.C. 154(b) by 469 days.

(21) Appl. No.: 12/344,011

(22) Filed: Dec. 24, 2008

(65) Prior Publication Data

US 2009/0166074 A1 Jul. 2, 2009

(30) Foreign Application Priority Data

Dec. 28, 2007 (JP) ................................ P2007-340715

(51) Int. Cl.
*H05K 1/16* (2006.01)
(52) U.S. Cl. ...................................... 174/260
(58) Field of Classification Search .......... 174/255, 174/260
See application file for complete search history.

(56) References Cited

U.S. PATENT DOCUMENTS

| | | | | |
|---|---|---|---|---|
| 7,435,911 B2 * | 10/2008 | Kim et al. | ...................... | 174/260 |
| 7,615,861 B2 * | 11/2009 | Chang et al. | ..................... | 257/704 |
| 2011/0042127 A1 * | 2/2011 | Ohtsuka et al. | ................ | 174/255 |

FOREIGN PATENT DOCUMENTS

JP A-2004-071589 3/2004

* cited by examiner

*Primary Examiner* — Chau Nguyen
(74) *Attorney, Agent, or Firm* — Oliff & Berridge, PLC

(57) ABSTRACT

The present invention provides an electronic component which is capable of effectively suppressing the characteristic deterioration of the passive element portion. An electronic component comprises a ceramic substrate, a passive element portion on the substrate, an insulator layer which is provided over the passive element portion and comprises a through-hole, a lead terminal which is fitted in the through-hole of the insulator layer and electrically connected to the passive element portion, and an external connection terminal which is electrically connected to the lead terminal. The insulator layer comprises a first face on the side of the passive element portion, a second face on the side opposite the passive element portion, and a third face which connects the first face and the second face and constitutes the peripheral face of the insulator layer, the external connection terminal is in contact with the lead terminal and the second face and the third face of the insulator layer. In a cross-section of the through-hole in a thickness direction of the substrate, a boundary line between the internal surface of the through-hole and the lead terminal is inclined in a direction moving away from a region of the third face with which the external connection terminal is in contact with an end of the boundary line on the side of the first face being taken as a fixed point.

6 Claims, 21 Drawing Sheets

(a)

(b)

(c)

(d)

ELECTRONIC COMPONENT

BACKGROUND OF THE INVENTION

1. Field of the Invention

The present invention relates to an electronic component.

2. Related Background Art

Due to the development of the miniaturization and higher functionality of electronic devices in recent years, there has come to be an increased need for the miniaturization and higher functionality of passive parts such as inductors and capacitors which have conventionally been used separately. In order to respond to such a need, technological development to produce small and low-profile electronic components of a high dimensional accuracy by using thin-film formation processes such as a sputtering system, vapor deposition, and CVD, and microfabrication technology such as photolithography and dry etching has been carried out.

One such electronic component produced by using such a thin-film formation process and microfabrication technology has a thin-film capacitor. The electronic component disclosed in Japanese Patent Application Laid Open No. 2004-71589 comprises a substrate, a capacitor portion, which is provided on the substrate, and two external connection terminals which are electrically connected to the capacitor portion. The capacitor portion comprises a lower electrode, which is provided on the substrate, a dielectric thin film, which is provided on the lower electrode, and an upper electrode, which is provided on the dielectric thin film. The upper electrode and external connection terminals are electrically connected by lead terminals.

However, the electronic component according to Japanese Patent Application Laid Open No. 2004-71589 is confronted by the problems indicated hereinbelow.

That is, in this electronic component, the lead terminals and the external connection terminals are in a naked state. Hence, the lead terminals and the external connection terminals are oxidized as time elapses and as a result, there is a risk that the characteristics of the capacitor portion will deteriorate.

SUMMARY OF THE INVENTION

Some embodiments of the present invention provide an electronic component capable of effectively suppressing deterioration of the characteristics of a passive element portion.

The present inventor pursued a vigorous investigation. As a result, the present inventors considered whether the characteristic deterioration caused by the oxidation of a passive element portion could be suppressed with an electronic component which has a constitution in which a passive element portion such as a capacitor is protected by covering the passive element portion with an insulator layer, lead terminals are made to fill through-holes which penetrate the insulator layer such that the lead terminals are electrically connected to the passive element portion, and the lead terminals are covered by external connection terminals such that the lead terminals and external connection terminals are electrically connected. Here, the present inventors also considered the following points. That is, in cases where the electronic component is mounted on a circuit substrate, the external connection terminals are normally connected to the circuit substrate using solder. Hence, consideration was also given to the possibility that the external connection terminals would be pulled outside the peripheral face of the insulator layer as shrinkage occurs when the solder cools and accordingly, that the parts of the periphery of the insulator layer with which the external connection terminals are in contact would be pulled and peeling would occur between the lead terminals and the internal surfaces of the through-holes. The present inventors also arrived at completion of the present invention as a result of repeated vigorous investigation.

One aspects of the present invention is an electronic component, comprising: a ceramic substrate; a passive element portion provided on the ceramic substrate; an insulator layer provided over the passive element portion and comprising a through-hole; a lead terminal fitted in the through-hole in the insulator layer and electrically connected to the passive element portion; and an external connection terminal electrically connected to the lead terminal, wherein the insulator layer comprises a first face on the side of the passive element portion, a second face on the side opposite the passive element portion, and a third face connecting the first face and the second face and constituting a peripheral face of the insulator layer, the external connection terminal is in contact with the lead terminal and the second and third faces of the insulator layer, and in a cross-section in a thickness direction of the ceramic substrate where the through-hole is present, a peripheral boundary line, which is the boundary line closer to the third face of two boundary lines between the lead terminal and an internal surface of the through-hole, is inclined in a direction moving away from a region of the third face with which the external connection terminal is in contact with an end of the peripheral boundary line on the side of the first face being taken as a fixed point. With the present invention, not all of the peripheral boundary line need necessarily be inclined in a direction moving away from a region of the third face with which the external connection terminal is in contact. The part neighboring the fixed point alone may be inclined in a direction moving away from the region of the third face with which the external connection terminal is in contact. Furthermore, the first face of the insulator layer refers to the whole region of the insulator layer in contact with the passive element portion.

With this electronic component, when the external connection terminal of the electronic component is connected to the circuit substrate using solder when mounting the electronic component on the circuit substrate, the external connection terminal is pulled outside the third face which is the peripheral face of the insulator layer as shrinkage due to the cooling of the solder occurs. Here, the external connection terminal is in contact with the second face. The tensile stress along the second face of the insulator layer is therefore greater than the tensile stress along the first face thereof.

Here, supposing that, in a cross-section in a thickness direction of the ceramic substrate where the through-hole is present, a peripheral boundary line which is the boundary line closer to the third face of the two boundary lines between the lead terminal and an internal surface of the through-hole is inclined in a direction approaching a region of the third face with which the external connection terminal is in contact with an end of the peripheral boundary line on the side of the first face being taken as a fixed point, the part between a region of the insulator layer with which the external connection terminal is in contact and the through-hole is then readily pulled.

In contrast, with the present invention, in a cross-section in a thickness direction of the ceramic substrate where the through-hole is present, a peripheral boundary line which is the boundary line closer to the third face of the two boundary lines between the lead terminal and an internal surface of the through-hole is inclined in a direction moving away from a region of the third face with which the external connection terminal is in contact with an end of the peripheral boundary line on the side of the first face being taken as a fixed point. Hence, the part between a region of the insulator layer with which the external connection terminal is in contact and the through-hole is not readily pulled. Hence, peeling of the lead terminal from the internal surface of the through-hole can be made to not readily occur. As a result, the oxidation-induced characteristic deterioration of the passive element portion which is covered and protected by the insulator layer is then effectively suppressed.

With the above electronic component, the peripheral boundary line is inclined such that the angle between the tangent to the peripheral boundary line at each point and the first face is constant, for example. In this case, there is the benefit that peeling can be further prevented.

Furthermore, with the above electronic component, the peripheral boundary line is preferably inclined such that the angle between the tangent to the peripheral boundary line at each point and the first face increases from the first face toward the second face. In this case, the area of contact between the lead terminal and an internal surface of the through-hole can be increased in comparison with a case where the slope of the tangent is fixed. Hence, peeling between the lead terminal and the internal surface of the through-hole can be suppressed more effectively.

With the above electronic component, in a cross-section in a thickness direction of the ceramic substrate where the through-hole is present, a boundary line further away from the third face of the two boundary lines between the lead terminal and the internal surface of the through-hole is preferably inclined in a direction moving away from a region of the third face with which the external connection terminal is in contact with an end of the boundary line on the side of the first face being taken as a fixed point.

In this case, pulling of the lead terminal outside the third face can be made difficult. Hence, peeling of the lead terminal from the internal surface of the through-hole can be made to not readily occur. As a result, the oxidation-induced characteristic deterioration of the passive element portion which is covered and protected by the insulator layer is then suppressed more effectively.

With the above electronic component, the lead terminal preferably comprises a fitting portion which is fitted in the through-hole, and a cross-section of the fitting portion which is parallel to the ceramic substrate is preferably polygonal and has chamfered corners.

In this case, stress which is applied to the corners of the fitting portion of the lead terminal is dispersed and peeling between the fitting portion and the internal surface of the through-hole does not readily occur.

With the above electronic component, a cross-section of the lead terminal which is parallel to the ceramic substrate is preferably polygonal and the corners of the cross-section are preferably formed rounded.

In this case also, stress at the corners of the lead terminal is dispersed and peeling between the fitting portion and the internal surface of the through-hole does not readily occur.

The present invention provides an electronic component which is capable of effectively suppressing characteristic deterioration of a passive element portion.

DESCRIPTION OF THE PREFERRED EMBODIMENTS

Embodiments of the present invention will be described in detail hereinbelow.

First Embodiment

Figure 1:
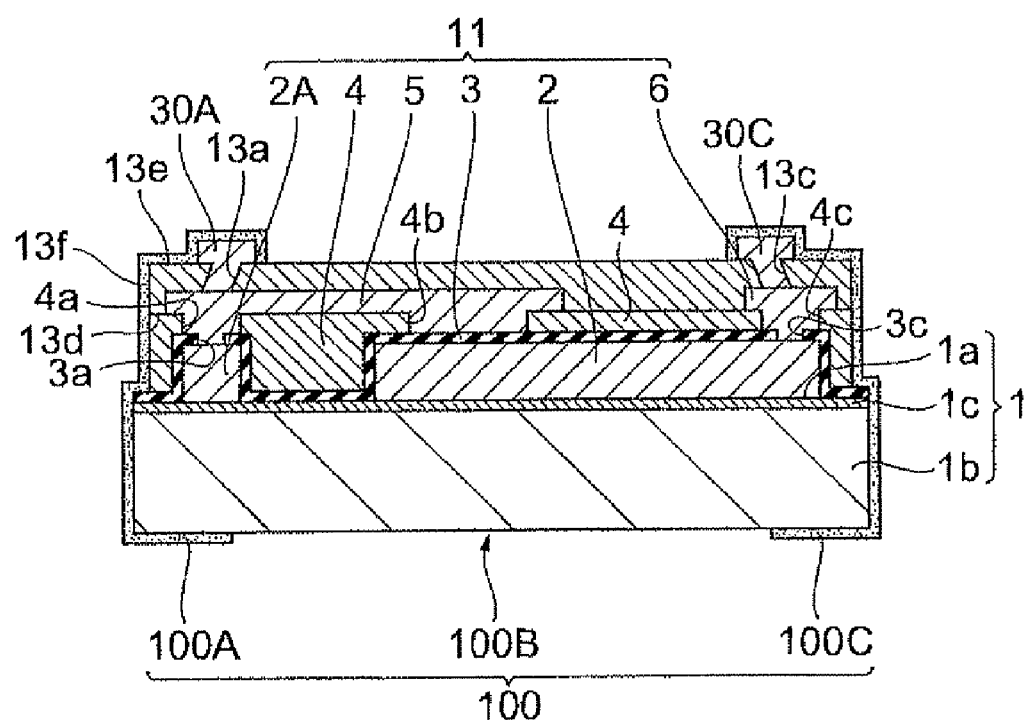
FIG. 1 is a cross-sectional view of an embodiment of an electronic component according to the present invention.
Figure 2:
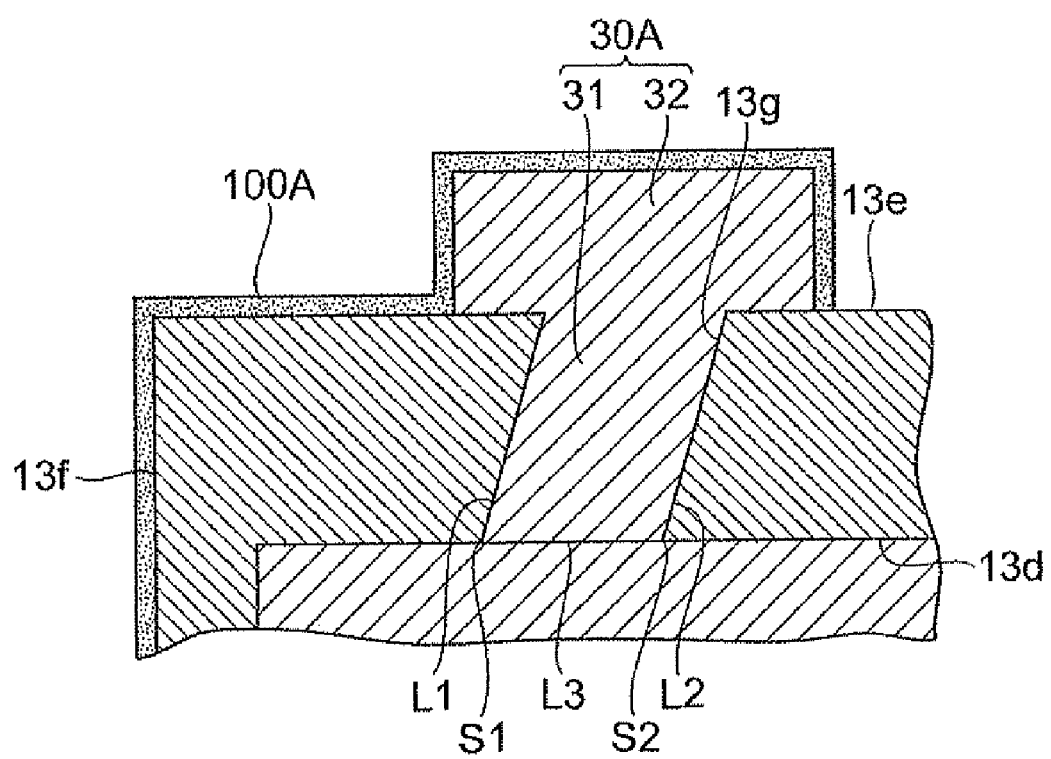
FIG. 2 is a partial enlarged view of FIG. 1.

First, a first embodiment of the electronic component according to the present invention will be described with reference to FIGS. 1 to 3. FIG. 1 is a cross-sectional view of a first embodiment of an electronic component according to the present invention; FIG. 2 is a partial enlarged view of FIG.

Figure 3:
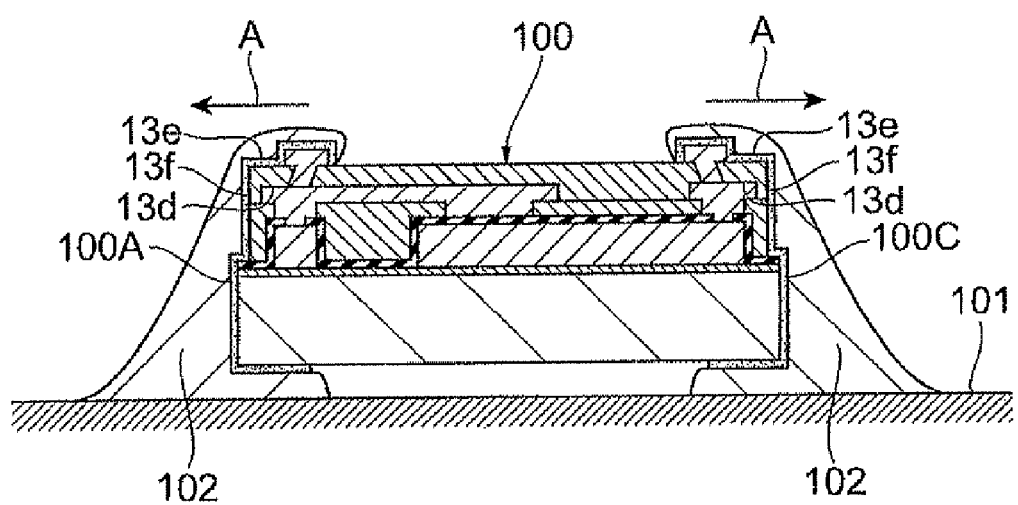
FIG. 3 is a cross-sectional view of a state where the electronic component of FIG. 1 is mounted on a circuit substrate.

1; and FIG. 3 is a cross-sectional view of a state where the electronic component of FIG. 1 is mounted on a circuit substrate.

As shown in FIG. 1, an electronic component 100 of this embodiment comprises a main body portion 100B and external connection terminals 100A and 100C which are provided in contact with the two ends of the main body portion 100B so as to cover same. The external connection terminals 100A and 100C are disposed separately from one another. The main body portion 100B comprises a ceramic substrate (called simply a 'substrate' hereinbelow) 1, a capacitor portion 11 constituting a passive element portion which is provided on the side of a main face 1a of the substrate 1, and an insulator layer 13 which is provided on the capacitor portion 11.

The substrate 1 is constituted by a base material main body portion 1b and a planarizing film 1c which is provided on the base material main body portion 1b and is in contact with a lower electrode portion 2 and a dielectric film 3.

The capacitor portion 11 comprises a lower electrode portion 2 and a conductor portion 2A which are provided on the substrate 1. The lower electrode portion 2 and the conductor portion 2A are disposed separately from one another and are not electrically connected to each other. The lower electrode portion 2 and the conductor portion 2A are covered by the dielectric film 3. The dielectric film 3 also covers parts of the main face 1a of substrate 1 where the lower electrode portion 2 and the conductor portion 2A are not provided. Furthermore, the dielectric film 3 is covered by an insulating film 4. The insulating film 4 controls the size of the capacitor capacitance of the electronic component 100 and fulfils the role of insulation between the end of an upper electrode portion 5 and the end of the lower electrode portion 2. A first opening 4a is formed in the insulating film 4 in a position opposite the conductor portion 2A and a second opening 4b and a third opening 4c are formed in a position opposite the lower electrode portion 2. The second opening 4b and a third opening 4c are formed in separate positions.

A through-hole 3a, which communicates with the first opening 4a, is formed in the dielectric film 3 and a through-hole 3c, which communicates with the third opening 4c, is also formed in the dielectric film 3. The upper electrode portion 5 is also provided on the insulating film 4. One end of the upper electrode portion 5 is inserted in the second opening 4b so as to contact the dielectric film 3 and the other end of the upper electrode portion 5 is inserted in the first opening 4a and the through-hole 3a so as to contact the conductor portion 2A. In addition, a feed electrode portion 6 which feeds the lower electrode portion 2 is provided on the insulating film 4. The feed electrode portion 6 is inserted in the third opening 4c and the through-hole 3c so as to contact the lower electrode portion 2.

The insulator layer 13 serves to suppress the characteristic deterioration of the capacitor portion 11 caused by oxidation of the upper electrode portion 5 or the like and the insulator layer 13 is provided so as to cover the capacitor portion 11 in order to protect the capacitor portion 11.

Here, the insulator layer 13 comprises a first face 13d on the side of the capacitor portion 11, a second face 13e on the side opposite the capacitor portion 11, and a third face 13f which connects the first face 13d and the second face 13e and constitutes the peripheral face of the insulator layer 13.

Through-holes 13a and 13c through which lead terminals 30A and 30C pass respectively are formed in the insulator layer 13. The through-holes 13a and 13c extend so as to link the first face 13d and the second face 13e.

The lead terminal 30A electrically connects the upper electrode portion 5 of the capacitor portion 11 and the external connection terminal 100A and comprises a fitting portion 31, which is fitted in the through-hole 13a, and a head portion 32, which is the end of the fitting portion 31 and provided outside the through-hole 13a. The lead terminal 30C electrically connects the feed electrode portion 6 of the capacitor portion 11 and the external connection terminal 100C and comprises the fitting portion 31, which is fitted in the through-hole 13c and the head portion 32, which is the end of the fitting portion 31 and provided outside the through-hole 13c.

Further, the external connection terminal 100A is in contact with the head portion 32 of the lead terminal 30A, and the second face 13e and the third face 13f of the insulator layer 13, and also in contact with the peripheral face of the insulating film 4, the peripheral face of the dielectric film 3, the peripheral face of the substrate 1, and the face of the substrate 1 opposite the main face 1a. The external connection terminal 100C is in contact with the head portion 32 of the lead terminal 30C, and the second face 13e and the third face 13f of the insulator layer 13, and also in contact with the peripheral face of the insulating film 4, the peripheral face of the dielectric film 3, the peripheral face of the substrate 1, and the face of the substrate 1 on the opposite side from the main face 1a.

Here, the shapes of the through-holes 13a and 13c of the insulator layer 13 will be described using FIG. 2. Because the through-holes 13a and 13c both have the same constitution, only the through-hole 13a will be described.

As shown in FIG. 2, in a cross-section of the electronic component 100 of the through-holes 13a and 13c in a thickness direction of the substrate 1, there are two boundary lines between the internal surface 13g of the through-hole 13a and the lead terminal 30A. Supposing that these boundary lines are boundary lines L1 and L2 respectively, that the boundary line closer to the third face 13f is a peripheral boundary line L1, and that the boundary line further away from the third face 13f is L2, the peripheral boundary line L1 is inclined in a direction moving away from a region of the third face 13f with which the external connection terminal 100A is in contact with an end S1 on the side of the first face 13d being taken as a fixed point.

Here, the peripheral boundary line L1 is linear. In other words, the peripheral boundary line L1 is inclined such that the slope of a tangent relative to a boundary line L3 between the first face 13d and the lead terminal 100A is fixed, and the tangent to the peripheral boundary line L1 at each point and the first face 13d is constant.

Furthermore, the boundary line L2 is also inclined in a direction moving away from a region of the third face 13f with which the external connection terminal 100A is in contact with the end S2 on the side of the first face 13d being taken as a fixed point. Here, the boundary line L2 is also linear. In other words, the boundary line L2 is inclined such that the slope of a tangent relative to a boundary line L3 between the first face 13d and the lead terminal 100A is fixed, and the tangent to the boundary line L2 at each point and the first face 13d is constant.

Here, although parallel to the boundary line L1 in this embodiment, the boundary line L2 may also be nonparallel. However, the benefit of the boundary line L2 being parallel to the boundary line L1 in comparison with a case where the boundary line L2 is nonparallel is that the resistance force is strong relative to the tensile stress from the external connection terminal 100A.

With this electronic component 100, when the external connection terminals 100A and 100C of the electronic component 100 are connected to the circuit substrate 101 using solder 102 upon mounting the electronic component 100 on the circuit substrate 101 as shown in FIG. 3, the external connection terminal 100A is pulled toward the outside of the third face 13f which is the peripheral face of the insulator layer 13 (in the direction of the arrow A in FIG. 3) due to shrinkage due to cooling of the solder 102. Here, the external connection terminal 100A is in contact with the second face 13e. Therefore, the tensile stress along the second face 13e is greater than the tensile stress along the first face 13d of the insulator layer 13.

Here, presuming that, in cases where, in a cross-section of the electronic component 100 of the through-holes 13a and 13c in a thickness direction of the substrate 1, the peripheral boundary line L1 is inclined in a direction approaching a region of the third face 13f with which the external connection terminal 100A is in contact with an end of the peripheral boundary line L1 on the side of the first face 13d being taken as a fixed point, the part between a region of the insulator layer 13 with which the external connection terminal 100A is in contact and the through-hole 13a is readily pulled.

In contrast, in this embodiment, in a cross-section of the electronic component 100 of the through-holes 13a and 13c in a thickness direction of the substrate 1, the peripheral boundary line L1 is inclined in a direction moving away from a region of the third face 13f with which the external connection terminal 100A is in contact with the end S1 on the side of the first face 13d being taken as a fixed point. For this reason, a part which is between a region of the insulator layer 13 with which the external connection terminal 100A is in contact and the through-hole 13a is not readily pulled. Hence, peeling of the lead terminal 30A from the internal surface 13g of the through-hole 13a can be made to not readily occur. As a result, the oxidation-induced characteristic deterioration of the capacitor portion 11 which is covered and protected by the insulator layer 13 is then effectively suppressed.

Furthermore, in the above electronic component 100, the peripheral boundary line L1 affords the benefit of allowing peeling of the lead terminal 30A from the first face 13a to be further prevented.

Figure 4:
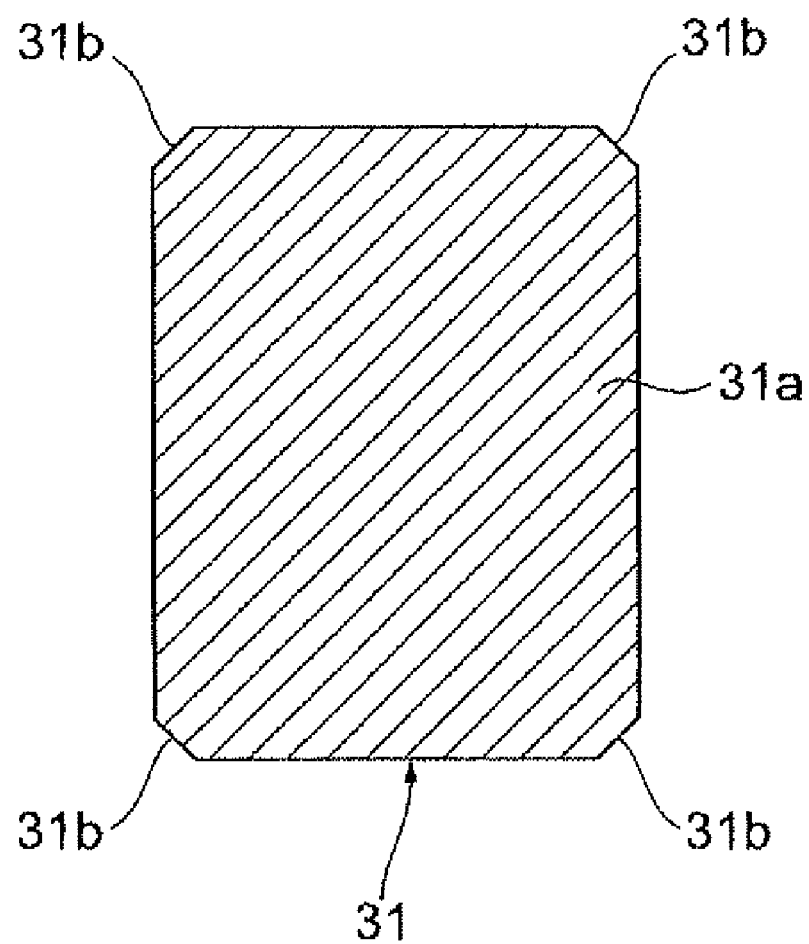
FIG. 4 shows an example of a cross-sectional shape of the lead terminal of FIG. 1 which is parallel to a ceramic substrate.

There are no particular limitations on the shape of the fitting portion 31 of the lead terminal 30A. The shape of the cross-section parallel to the substrate 1 may also be circular or elliptical, or polygonal such as triangular or square. In cases where the cross-section 31a of the fitting portion 31 is polygonal, corners 31b of the fitting portion 31 are preferably chamfered as shown in FIG. 4. In this case, stress applied to the corners of the fitting portion 31 of the lead terminal 30A is dispersed and peeling between the fitting portion 31 and the internal surface 13g of the through-hole 13a does not readily occur.

Figure 5:
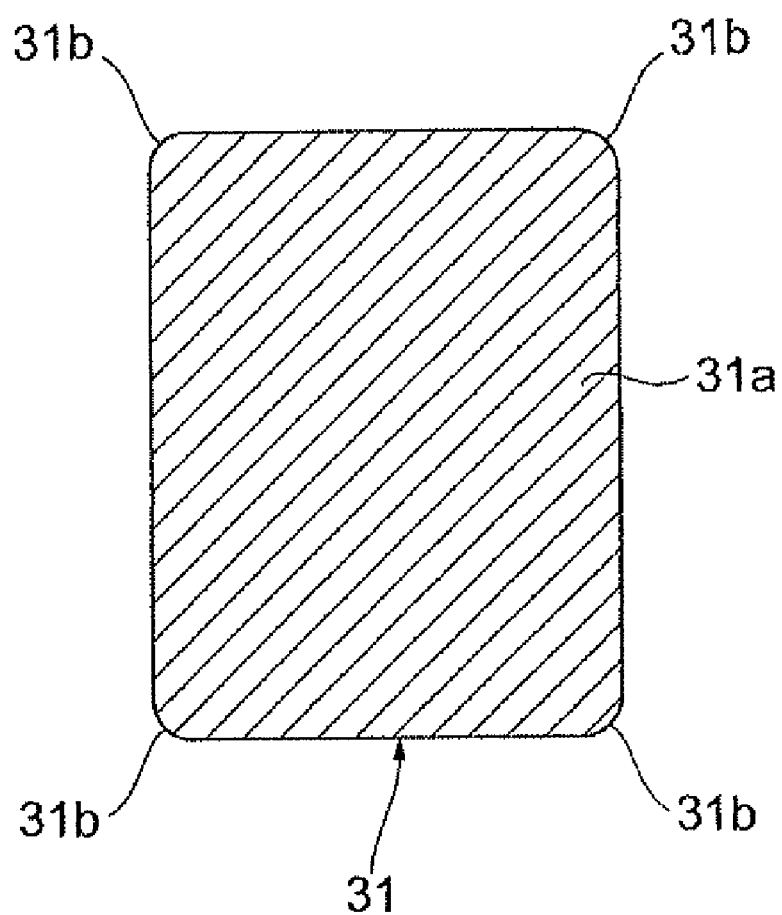
FIG. 5 shows another example of a cross-sectional shape of the lead terminal of FIG. 1 which is parallel to the ceramic substrate.

Furthermore, in a case where the cross-section 31a of the fitting portion 31, which is parallel to the substrate 1, is polygonal (a square shape, for example), the corners of the cross-section 31a are preferably formed rounded as shown in FIG. 5. Here also, with the corners of the cross-section 31a formed rounded, improvements in reliability are achieved by causing a plating conductor to fill the through-hole 13a tightly and the stress on the corners can be dispersed.

The lead terminal 30C preferably also has the same constitution as the lead terminal 30A.

The method for producing the electronic component 100 will be described subsequently with reference to FIGS. 6 to 19. FIGS. 6 to 19 are process diagrams which show part of a series of processes for producing the electronic component 100 by means of cross-sectional views.

Figure 6:
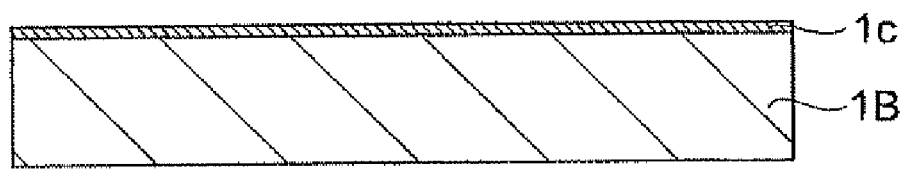
FIG. 6 is a process diagram which shows part of a series of processes for producing the electronic component of FIG. 1 by means of a cross-sectional end face diagram.

First, an alumina film which is to constitute a planarizing film is formed on a base material main body portion 1b through sputtering, for example, and the alumina film undergoes planarization by means of CMP, for example, thereby forming a planarizing film 1c (FIG. 6).

Figure 7:
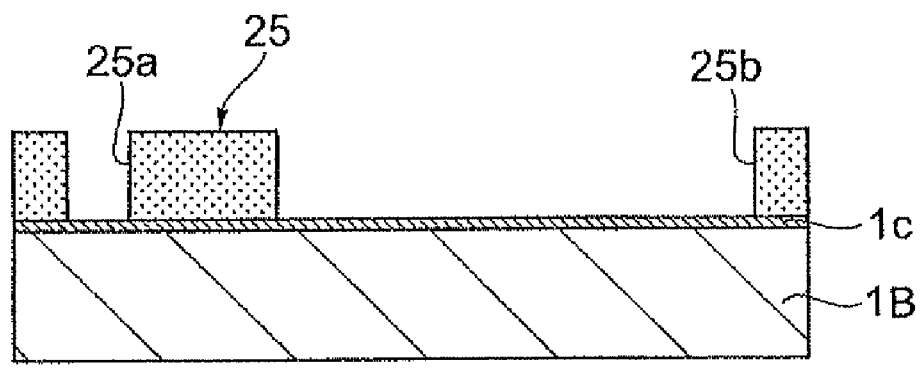
FIG. 7 is a process diagram which shows part of a series of processes for producing the electronic component of FIG. 1 by means of a cross-sectional end face diagram.

A plating seed layer (not shown) is subsequently formed on the planarizing film 1c. Thereafter, a resist pattern 25, which has an opening 25b in the position in which a lower electrode portion 2 is to be formed and an opening 25a in the position in which the conductor portion 2A is to be formed, is formed on the seed layer (FIG. 7).

Figure 8:
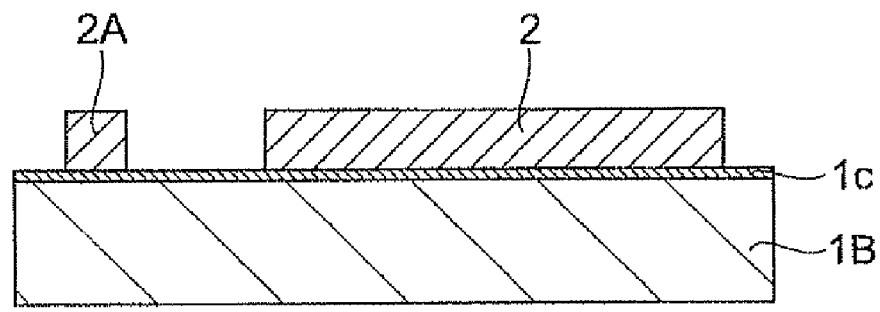
FIG. 8 is a process diagram which shows part of a series of processes for producing the electronic component of FIG. 1 by means of a cross-sectional end face diagram.

Subsequently, a plating layer is formed using electroplating on a seed layer which is exposed within the opening 25a. Thereafter, the resist pattern 25 is removed, whereupon the exposed seed layer is removed. The lower electrode portion 2 and the conductor portion 2A are thus formed (FIG. 8).

Figure 9:
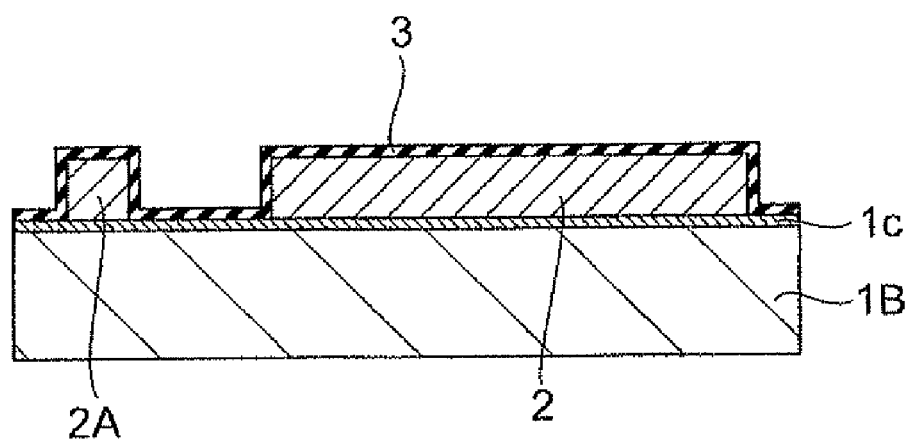
FIG. 9 is a process diagram which shows part of a series of processes for producing the electronic component of FIG. 1 by means of a cross-sectional end face diagram.

Subsequently, the dielectric film 3 is formed to cover the lower electrode portion 2, the conductor portion 2A, and the main face 1a, which constitutes the exposed surface of the planarizing film 1c (FIG. 9). The dielectric film 3 is formed by using a film deposition process such as vapor deposition, sputtering, and plasma CVD and ALD to deposit dielectric material.

Figure 10:
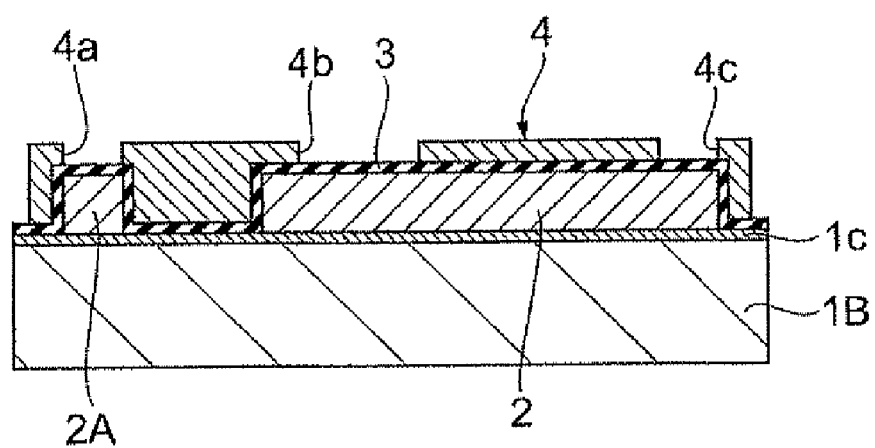
FIG. 10 is a process diagram which shows part of a series of processes for producing the electronic component of FIG. 1 by means of a cross-sectional end face diagram.

The insulating film 4, which comprises the first opening 4a, the second opening 4b, and the third opening 4c, is then formed on the surface of the dielectric film 3 (FIG. 10). The insulating film 4 is formed via a process of forming a photosensitive resin layer on the dielectric film 3 by means of spincoating and of patterning the photosensitive resin layer by means of pattern exposure and development, and a process of heat-hardening the patterned photosensitive resin layer, for example. As a result of heating the photosensitive resin layer, an insulating film 4 of superior heat resistance is obtained. The insulating film 4 which has been patterned with a high density and highly accurately can be produced at a low cost by using the photosensitive resin layer. The pattern exposure is performed using development to form the first opening 4a, the second opening 4b, and the third opening 4c in the photosensitive resin layer.

Figure 11:
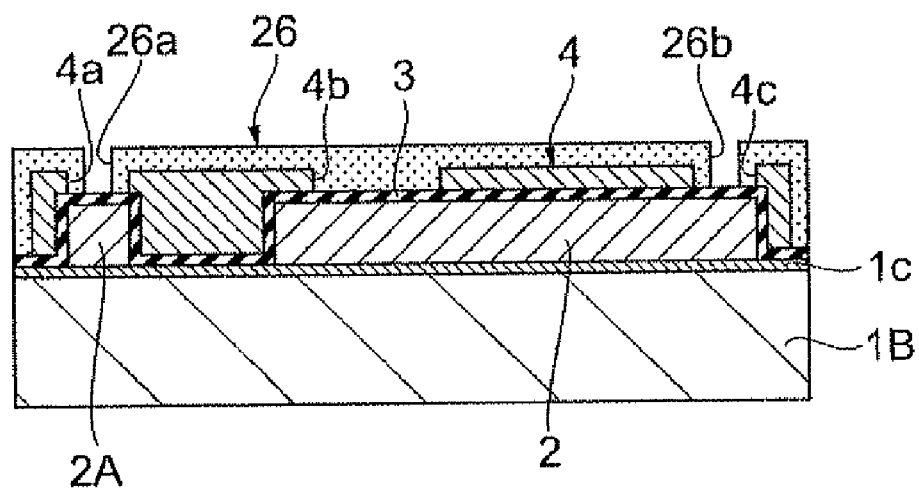
FIG. 11 is a process diagram which shows part of a series of processes for producing the electronic component of FIG. 1 by means of a cross-sectional end face diagram.

Thereafter, a resist pattern 26, which comprises openings 26a and 26b in positions which correspond to the conductor portion 2A and the lower electrode portion 2 respectively, is formed on the insulating film 4 (FIG. 11).

Figure 12:
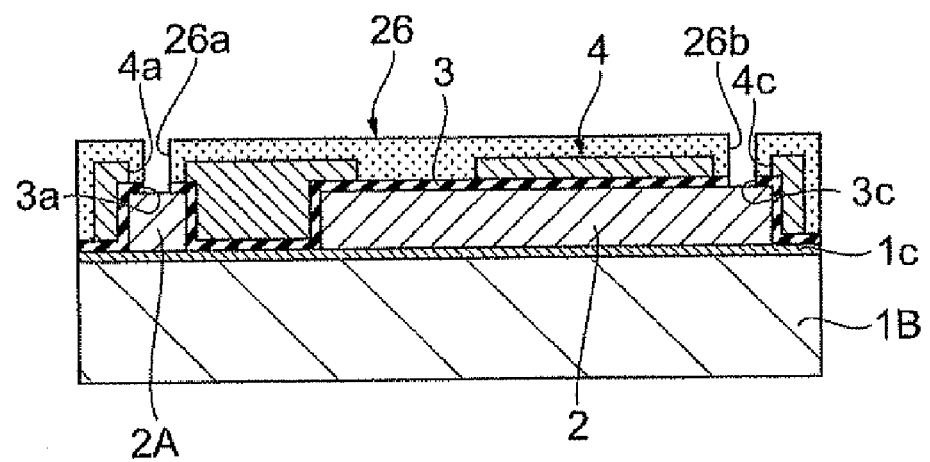
FIG. 12 is a process diagram which shows part of a series of processes for producing the electronic component of FIG. 1 by means of a cross-sectional end face diagram.
Figure 13:
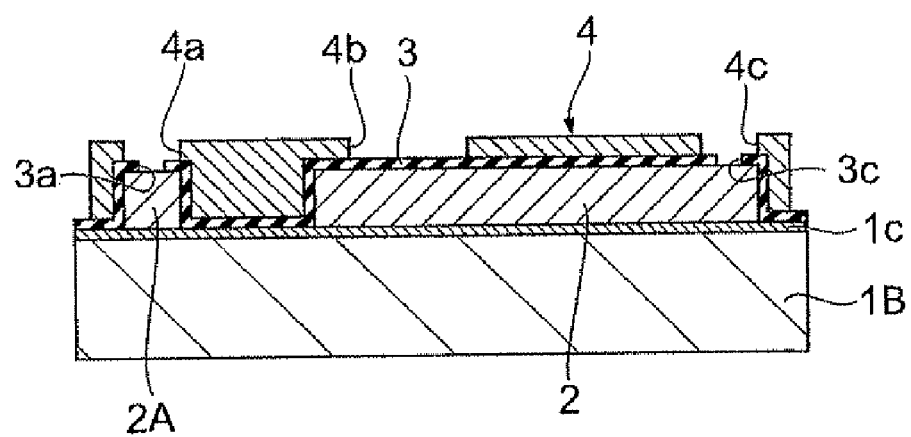
FIG. 13 is a process diagram which shows part of a series of processes for producing the electronic component of FIG. 1 by means of a cross-sectional end face diagram.

Subsequently, the through-hole 3a is formed in the dielectric film 3 in a position which corresponds to the conductor portion 2A by means of dry etching and ion milling and the through-hole 3c is formed in a position which corresponds to the lower electrode portion 2 (FIG. 12). The resist pattern is subsequently removed (FIG. 13).

Figure 14:
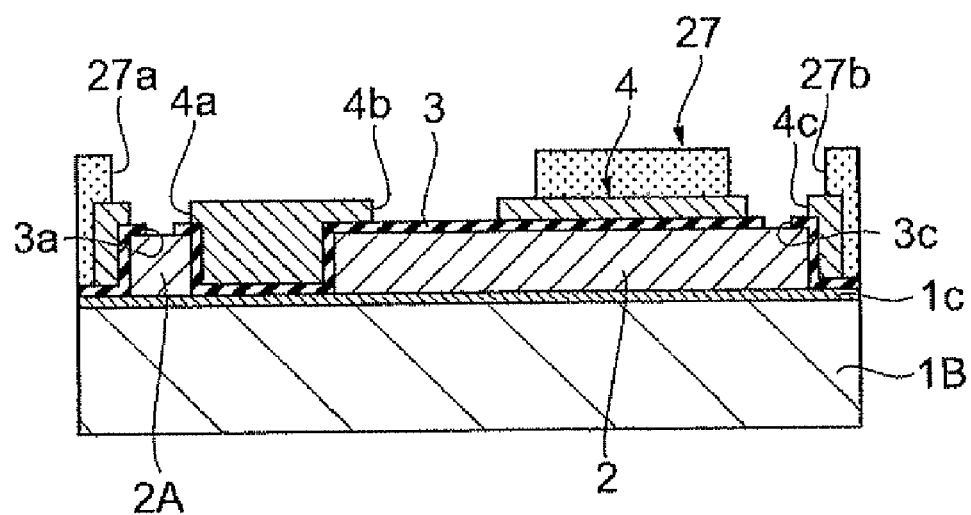
FIG. 14 is a process diagram which shows part of a series of processes for producing the electronic component of FIG. 1 by means of a cross-sectional end face diagram.

Thereafter, a seed layer (not shown) is deposited so as to cover the surface of the insulating film 4, the internal surface of the first opening 4a, the internal surface of the second opening 4b, and the internal surface of the third opening 4c of the insulating film 4, the internal surfaces of the through-holes 3a and 3c which are formed in the dielectric film 3, the exposed surface of the dielectric film 3, and the exposed surfaces of the lower electrode portion 2 and conductor portion 2A. A resist pattern 27, which comprises openings 27a and 27b in positions where the upper electrode portion 5 and feed electrode portion 6 are to be formed respectively, is formed on the seed layer (FIG. 14).

Figure 15:
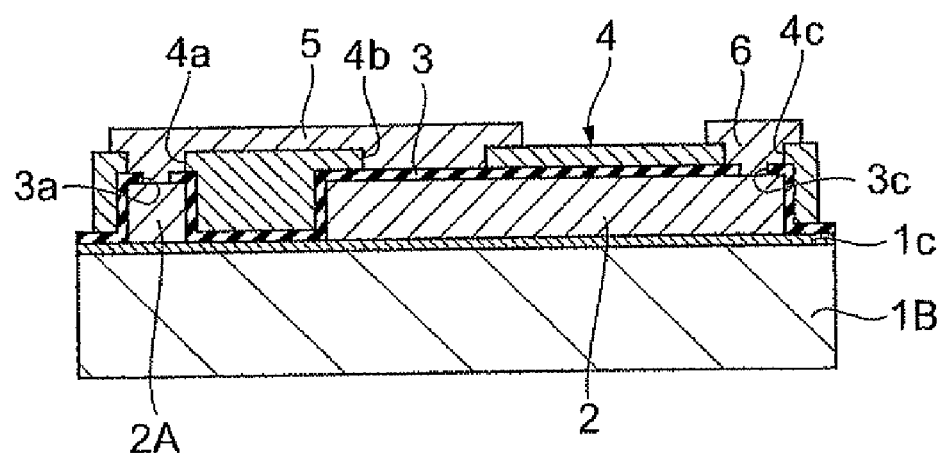
FIG. 15 is a process diagram which shows part of a series of processes for producing the electronic component of FIG. 1 by means of a cross-sectional end face diagram.

Thereafter, a plating layer is formed on the exposed seed layer by means of electroplating and the resist pattern 27 is then removed, whereupon the exposed seed layer is removed. Thus, at the same time as obtaining the upper electrode portion 5, the feed electrode portion 6 which contacts the lower electrode portion 2 is obtained (FIG. 15). The capacitor portion 11 is thus obtained on the main face 1a of the substrate 1.

Figure 16:
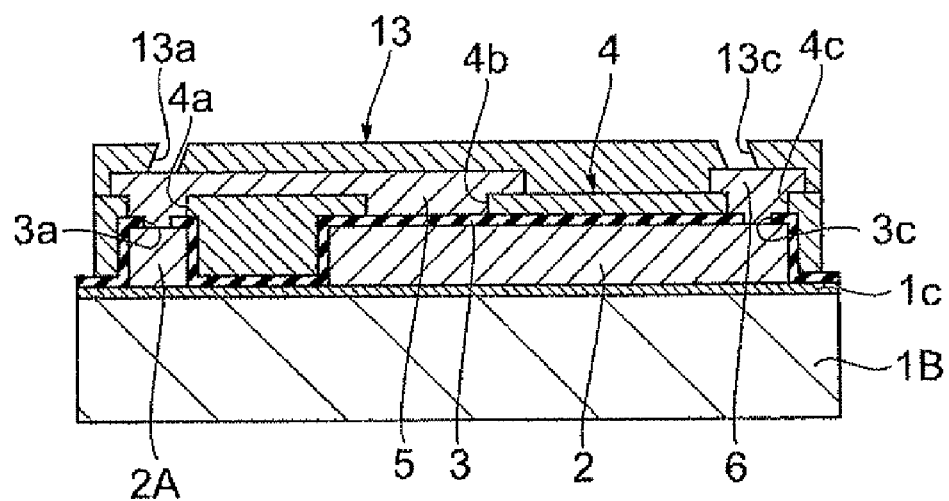
FIG. 16 is a process diagram which shows part of a series of processes for producing the electronic component of FIG. 1 by means of a cross-sectional end face diagram.

Thereafter, the insulator layer 13, which comprises the through-holes 13a and 13c, is formed on the capacitor portion 11 (FIG. 16). The insulator layer 13 can be formed by applying a photosensitive resin such as a photosensitive polyimide resin, for example, by means of spincoating or the like, sequentially performing exposure and development on the photosensitive resin, and then heat-hardening the photosensitive resin.

Here, the through-holes 13a and 13c can be formed as follows, for example. That is, the through-hole 13A is first formed by sequentially performing exposure and development on a photosensitive resin layer 20 which is formed on the upper electrode portion 5 ((a) of FIG. 17). Here, because the laser light used during exposure spreads as a result of diffraction, the through-hole 13A in the cross-section of the photosensitive resin layer 20 is normally a trapezoidal shape. Specifically, the through-hole 13A has a wider shape on the laser light exit side than on the laser light incident side.

Figure 17:
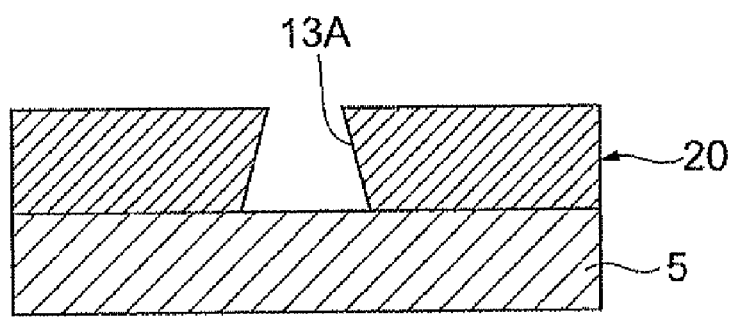
FIG. 17 shows part of a series of processes for forming a through-hole in FIG. 1 by means of a cross-sectional end face diagram.
Figure 17:
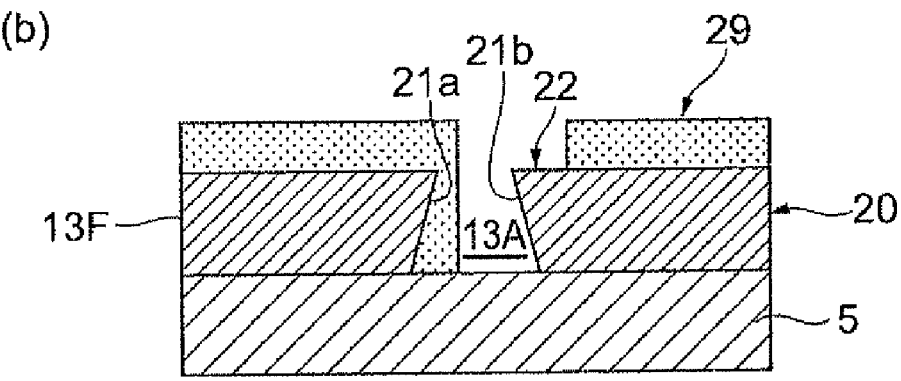
Figure 17:
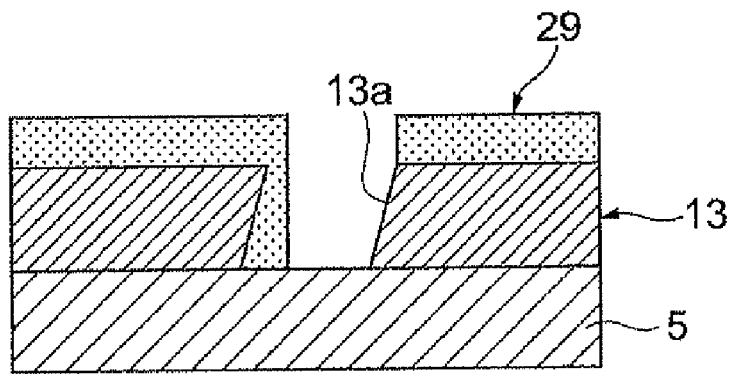
Figure 17:
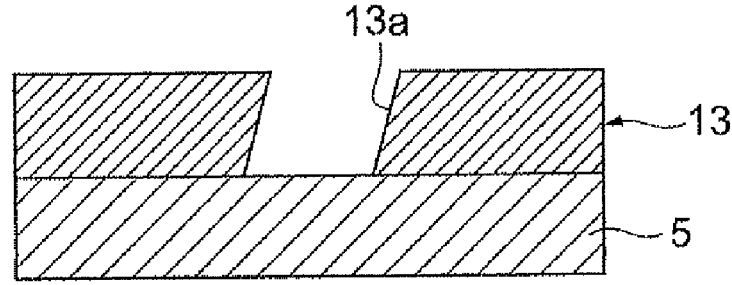

The resist pattern 29 is then formed on the photosensitive resin layer 20 ((b) of FIG. 17). Here, the resist pattern 29 is formed so as to cover an internal surface 21a of the photosensitive resin layer 20 which is closer to the peripheral face 13F, of the internal surface of the through-hole 13A and such that a part 22 which comprises an internal surface 21b which is further away from the peripheral face 13F protrudes.

Thereafter, the protruding part 22 of the internal surface of the through-hole 13A is removed by milling or the like ((c) of FIG. 17). The through-hole 13a is thus formed.

Finally, the resist pattern 29 is removed ((d) of FIG. 17). The insulator layer 13, which comprises the through-hole 13a, is thus formed. The through-hole 13c can also be formed in a similar manner.

Figure 18:
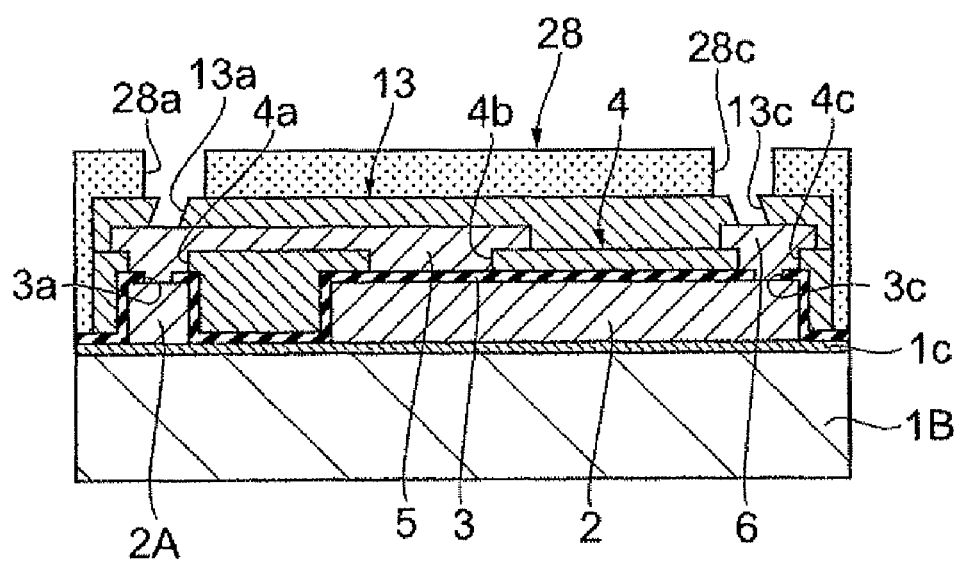
FIG. 18 is a process diagram which shows part of a series of processes for producing the electronic component in FIG. 1 by means of a cross-sectional end face diagram.

A seed layer is subsequently formed on the exposed surface of the dielectric film 3, on the surface of the insulator layer 13, and in the through-holes 13a and 13c. A resist pattern 28, which comprises openings 28a and 28c in positions which correspond to the through-holes 13a and 13c respectively, is then formed (FIG. 18). Here, the openings 28a and 28c are formed so as to have a larger open area than the through-holes 13a and 13c.

Figure 19:
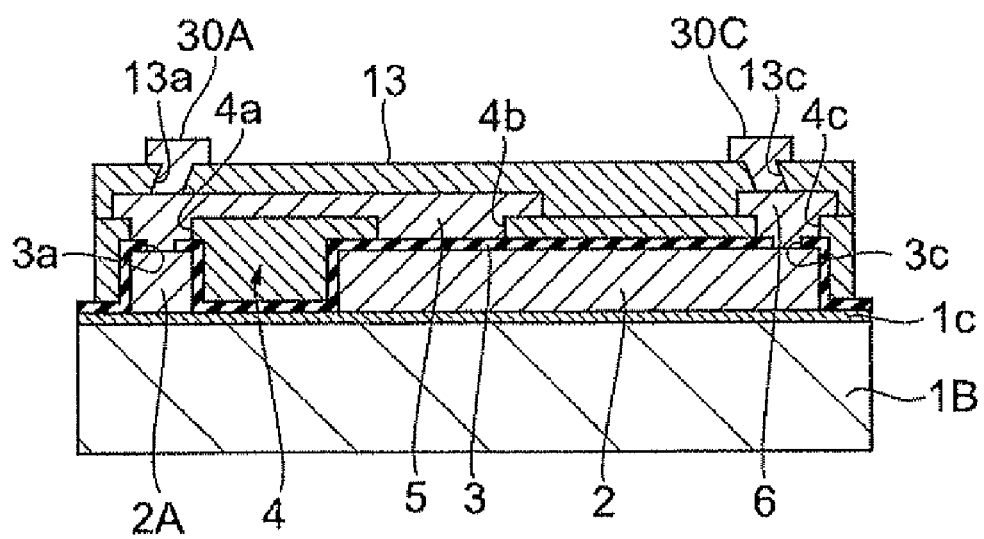
FIG. 19 is a process diagram which shows part of a series of processes for producing the electronic component in FIG. 1 by means of a cross-sectional end face diagram.

Thereafter, a plating layer is formed on the exposed seed layer by means of electroplating or the like, thereby forming the lead terminals 30A and 30C (FIG. 19). The plating layer is formed so as to invade the openings 28a and 28c. The resist pattern 28 is subsequently removed.

The base material main body portion 1b is then thinned to form the base material main body portion 1b. Here, in cases where a plurality of main body portions 100B are integrally linked, the main body portions 100B are each divided into individual main body portions by means of dicing. The main body portion 100B is thus obtained.

Finally, after forming base electrodes at the two ends of the main body portion 100B, the external connection terminals 100A and 100C are formed at the two ends of the main body portion 100B by means of barrel plating, for example. Here, the base electrodes are formed so as to be separate from one another. Specifically, one of the base electrodes is made to contact the upper electrode portion 5, while the other base electrode is made to contact the feed electrode portion 6. The external connection terminal 100A, which is in contact with the upper electrode portion 5, and the external connection terminal 100C, which is in contact with the feed electrode portion 6, are accordingly obtained (FIG. 1). The production of the electronic component 100 is thus completed.

Second Embodiment

Figure 20:
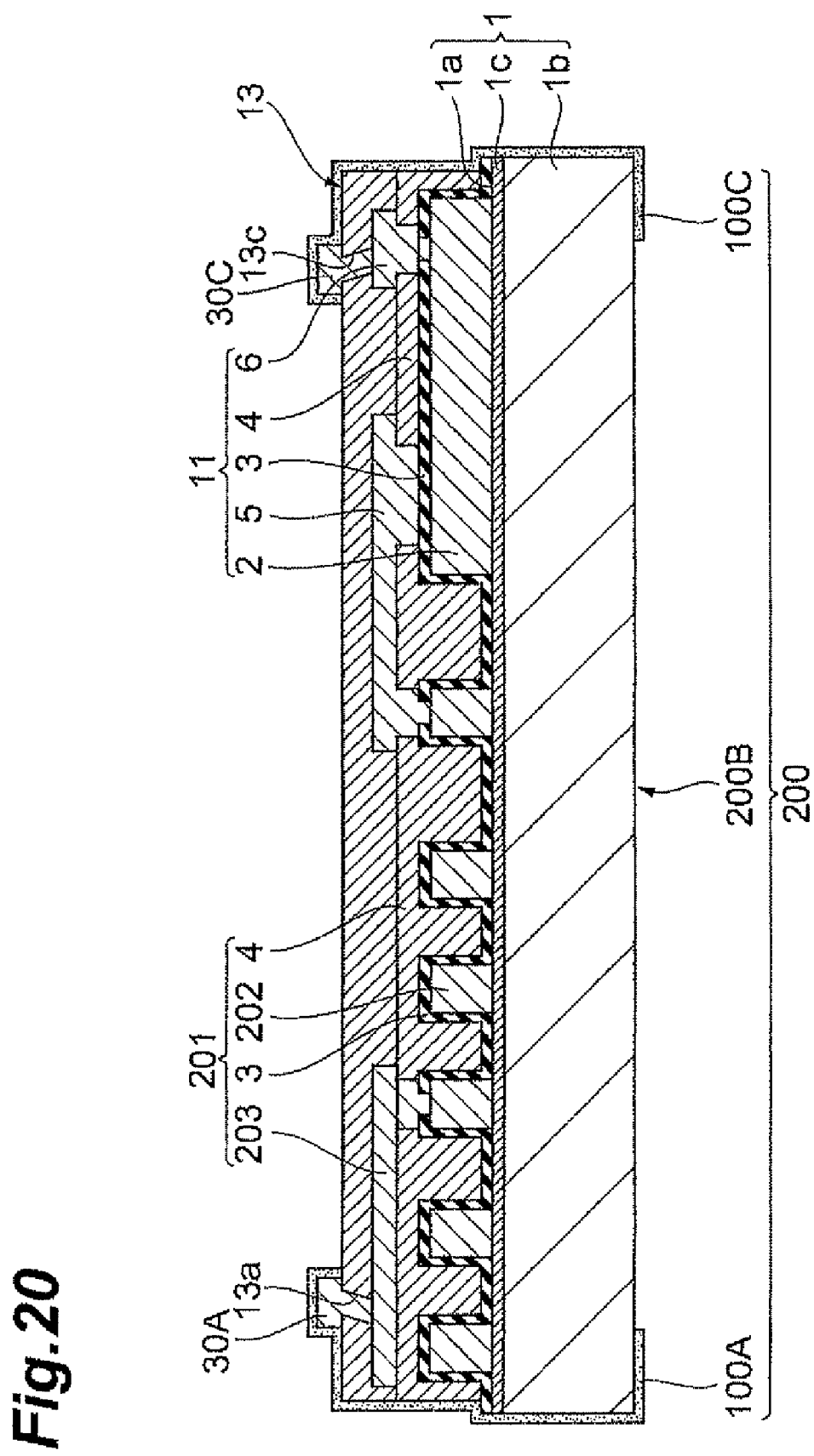
FIG. 20 is a cross-sectional view of another embodiment of the electronic component according to the present invention.

A second embodiment of the electronic component of the present invention will be described subsequently with reference to FIG. 20. Constituent elements which are the same as or equivalent to those of the first embodiment have the same reference numerals assigned thereto and repetitive description is avoided. FIG. 20 is a cross-sectional view of the second embodiment of the electronic component of the present invention.

As shown in FIG. 20, the electronic component 200 of this embodiment differs from the electronic component 100 in that the former uses the main body portion 200A instead of the main body portion 100A. Here, the main body portion 200B differs from the main body portion 100B of the electronic component 100 in that the former further comprises an inductor portion 201 which is electrically connected to the capacitor portion 11 on the main face 1a of the substrate 1. As a result, the electronic component 200 is able to function as an LC filter (LC circuit component). Here, even when shrinkage due to cooling of the solder is produced when mounting the electronic component 200 on the circuit substrate, peeling is not readily produced between the lead terminals 30A and 30C and the insulator layer 13. Hence, characteristic deterioration due to oxidation of the lead terminals 30A and 30C, the capacitor portion 11, and the inductor portion 201 (specifically the deterioration of the frequency characteristic) can be effectively suppressed.

The inductor portion 201 will now be described in detail. As shown in FIG. 20, the inductor portion 201 comprises a spiral-shaped coil portion 202, which is provided on the main face 1a of the substrate 1, the dielectric film 3, which covers the coil portion 202, the insulating film 4, which is provided on the dielectric film 3, and a lead conductor portion 203, which is provided on the insulating film 4 and electrically connected to the coil portion 202. The lead conductor portion 203 is in contact with the coil portion 202 via the opening formed in the insulating film 4 and the through-hole formed in the dielectric film 3. However, the lead conductor portion 203 is also in contact with the lead terminal 30A.

Figure 21:
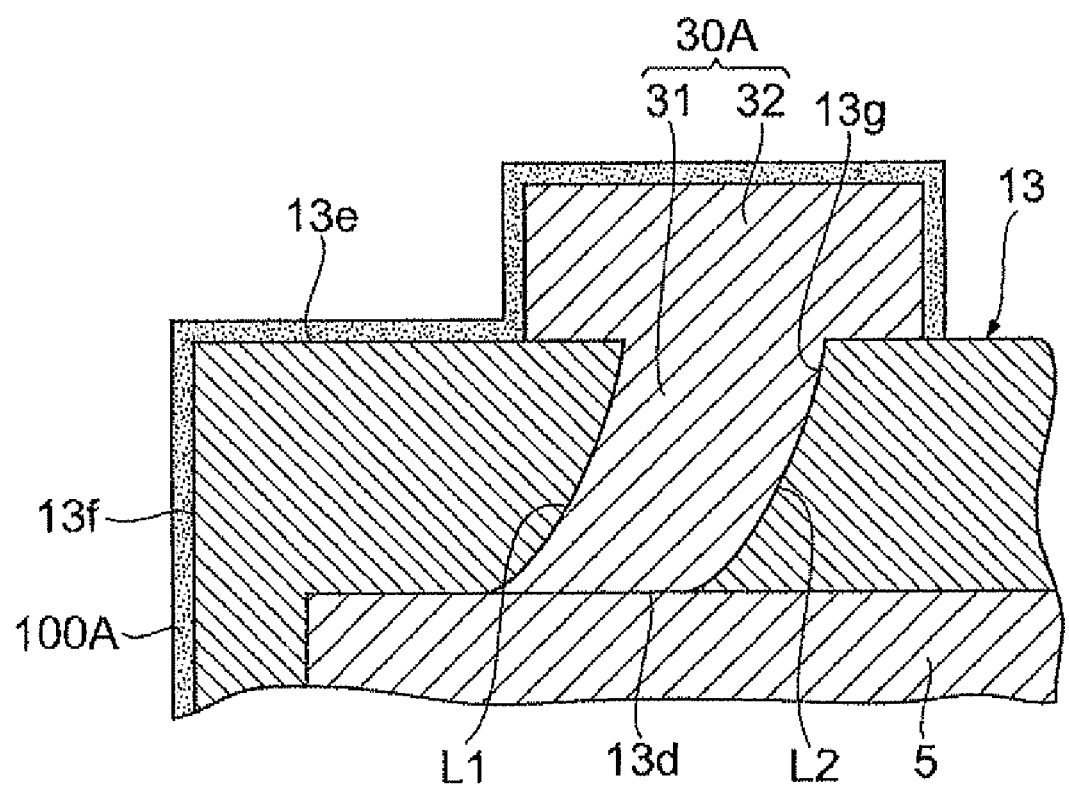
FIG. 21 is a partial enlarged cross-sectional view of a modified example of the shape of the through-hole in FIG. 1.

The present invention is not limited to the above embodiment. For example, in the above embodiment, the boundary lines L1 and L2 between the internal surface of the through-hole 13a and the lead terminal 30A are linear, but the boundary lines L1 and L2 are not limited to being linear. For example, as shown in FIG. 21, the boundary line L1 may also be inclined such that the slope of a tangent with respect to the boundary line between the first face 13d and the lead terminal 30A increases from the first face 13d toward the second face 13e, and the tangent to the peripheral boundary line L1 at each point and the first face 13d increases from the first face 13d toward the second face 13e. In this case, the area of contact between the lead terminal 30A and the internal surface 13g of the through-hole 13a can be increased in comparison with a case where the slope of the tangent is fixed. Hence, peeling between the lead terminal 30A and the internal surface 13g of the through-hole 13a can be more effectively suppressed. For the same reason, the boundary lines L1 and L2 between the internal surface of the through-hole 13c and the lead terminal 30C may also have the shape shown in FIG. 21 instead of being linear.

Furthermore, although the passive element portion is the capacitor portion 11 in the first embodiment above, the passive element portion may also be an inductor portion.

EXAMPLE

The content of the present invention will be described in specific terms hereinbelow by citing an Example and a Comparative Example but the present invention is not limited to the following Example.

Example 1

First, sputtering was used to form an alumina film which is to constitute a planarizing film on a base material main body portion comprising alumina, and the alumina film was subjected to planarization by means of CMP to form the planarizing film.

A seed layer was then formed by depositing Ti and Cu on the planarizing film through sputtering. A resist pattern which comprises an opening in each of the positions where the lower electrode portion and conductor portion are to be formed was then formed on the seed layer. The resist pattern was produced by using a photoresist.

A plating layer comprising Cu was subsequently formed by means of electroplating on the seed layer which is exposed in the openings. Thereafter, the resist pattern was removed and the exposed seed layer was then removed by means of ion milling. The lower electrode portion and conductor portion were thus formed.

The alumina, which constitutes a dielectric film of a thickness of 80 nm, was subsequently formed using sputtering to cover the lower electrode portion, conductor portion, and the exposed surface of the planarizing film.

An insulating film comprising three openings was then formed on the surface of the dielectric film. Specifically, a photosensitive polyimide resin (Photoneece UR-5100FX (Toray)) was applied by means of spincoating and a resist pattern which comprises three openings was formed by means of photolithography. Here, one opening among the three openings was formed in a position corresponding to the conductor portion and the remaining two openings were formed in positions corresponding to the lower electrode portion. The resist pattern was then heat-hardened at 380° C. and the insulating film was formed.

A resist pattern comprising openings in positions corresponding to the conductor portion and lower electrode portion respectively was then formed on the insulating film.

Thereafter, a resist pattern comprising an opening for forming a feed electrode portion was formed and a through-hole was formed in the dielectric film using dry etching to expose the lower electrode portion. The resist pattern was then peeled away.

After forming the seed layer by depositing Ti and Cu in that order, a resist pattern comprising openings for forming the upper electrode portion and the feed electrode portion was then formed. A plating layer comprising Cu was then formed on the seed layer by means of electroplating.

The resist pattern was removed and then exposed unnecessary parts of the seed layer were removed by means of ion milling. The upper electrode portion and feed electrode portion were thus formed. A photosensitive polyimide resin was formed on the upper electrode portion and the feed electrode portion by means of spincoating.

Thereafter, two through-holes were formed by sequentially performing exposure and development on the photosensitive polyimide resin. The two through-holes were formed in positions corresponding to the upper electrode portion and the feed electrode portion respectively and the opening shape of the through-hole was made an ellipse (size: short diameter 30 μm×long diameter 40 μm).

A resist pattern was then formed on the photosensitive polyimide resin. Here, the resist pattern was formed so as to cover an internal surface of the photosensitive polyimide resin which is closer to the peripheral face, of the internal surface of the through-hole and so that the part comprising an internal surface of the photosensitive polyimide resin which is further away from the peripheral face protrudes.

The exposed parts of the internal surface of the through-hole were subsequently removed by means of milling. Two through-holes were thus formed and the resist pattern was finally removed.

After forming the seed layer by depositing Ti and Cu in that order, a resist pattern comprising an opening for forming the lead terminal was then formed. A plating layer comprising Cu was then formed on the seed layer by means of electroplating.

The resist pattern was removed and exposed unnecessary parts of the seed layer were then removed by means of ion milling, thereby forming the lead terminal.

The alumina substrate was then thinned and divided up by means of dicing to obtain the main body portion.

Base electrodes which comprise Cr and Cu respectively were formed at the two ends of the main body portion and a plating layer comprising Ni and Sn was formed on the base electrode by means of barrel plating. An external connection terminal was formed at each of the two ends of the main body portion, whereby the electronic component was obtained.

When the shape of the through-hole in the insulator layer of the electronic component thus obtained was checked using SEM, the two boundary lines between the lead terminal and the internal surface of the through-hole were both inclined in a direction moving away from a region of the peripheral face of the insulator layer with which the external connection terminal was in contact with the ends of the boundary lines on the side of the feed electrode portion being taken as a fixed point. That is, the two boundary lines between the lead terminal and the internal surface of the through-hole were both inclined in a direction moving away from the side of the electronic component 100, with the ends of the boundary lines on the side of the feed electrode portion being taken as a fixed point.

Comparative Example 1

By adjusting the exposure and development conditions of the photosensitive polyimide resin on the upper electrode portion and the feed electrode portion, the boundary line closer to the peripheral face of the insulator layer, of the two boundary lines between the lead terminal and the internal surface of the through-hole was inclined in a direction approaching a region of the peripheral face of the insulator layer with which the external connection terminal is in contact with an end of the boundary line on the side of the feed electrode portion being taken as a fixed point. That is, the two boundary lines between the lead terminal and the internal surface of the through-hole were both inclined in a direction approaching the side of the electronic component 100, with the ends of the two boundary lines on the side of the feed electrode portion being taken as a fixed point. Otherwise, the electronic component was obtained in the same way as in Example 1.

Peeling Evaluation

The electronic component according to Example 1 and Comparative Example 1 was mounted on the circuit substrate by using solder. Thereafter, cross-sectional observation of the electronic component was performed using SEM. As a result, peeling between the lead terminal and the internal surface of the through-hole was not produced in the electronic component of Example 1. In contrast, in the electronic component of Comparative Example 1, peeling was seen between the internal surface on the side of the peripheral face of the insulator layer, of the internal surface of the through-hole, and the lead terminal.

It was accordingly observed as detailed above that the electronic component of the present invention is capable of effectively suppressing characteristic deterioration of a passive element portion.

What is claimed is:

1. An electronic component, comprising:
   a ceramic substrate;
   a passive element portion provided on the ceramic substrate;
   an insulator layer provided over the passive element portion and comprising a through-hole;
   a lead terminal fitted in the through-hole in the insulator layer and electrically connected to the passive element portion; and
   an external connection terminal electrically connected to the lead terminal,
   wherein the insulator layer comprises a first face which is in contact with the passive element portion, a second face on the side opposite the passive element portion, and a third face connecting the first face and the second face and constituting a peripheral face of the insulator layer,
   the external connection terminal is in contact with the lead terminal and the second and third faces of the insulator layer, and
   in a cross-section in a thickness direction of the ceramic substrate where the through-hole is present, a peripheral boundary line, which is the boundary line closer to the third face of two boundary lines between the lead terminal and an internal surface of the through-hole, is inclined in a direction moving away from a region of the third face with which the external connection terminal is in contact with an end of the peripheral boundary line on the side of the first face being taken as a fixed point.

2. The electronic component according to claim 1, wherein the peripheral boundary line is inclined such that the angle between the tangent to the peripheral boundary line at each point and the first face is constant.

3. The electronic component according to claim 1, wherein the peripheral boundary line is inclined such that the angle between the tangent to the peripheral boundary line at each line and the first face increases from the first face toward the second face.

4. The electronic component according to claim 1, wherein, in a cross-section in a thickness direction of the ceramic substrate where the through-hole is present, a boundary line further away from the third face of the two boundary lines between the lead terminal and the internal surface of the through-hole is inclined in a direction moving away from a region of the third face with which the external connection terminal is in contact with an end of the boundary line on the side of the first face being taken as a fixed point.

5. The electronic component according to claim 1, wherein the lead terminal comprises a fitting portion that is fitted in the through-hole, and a cross-section of the fitting portion which is parallel to the ceramic substrate is polygonal and has chamfered corners.

6. The electronic component according to claim 1, wherein a cross-section of the lead terminal which is parallel to the ceramic substrate is polygonal and the corners of the cross-section are formed rounded.

* * * * *